(12) United States Patent
Choe

(10) Patent No.: US 8,207,249 B2
(45) Date of Patent: Jun. 26, 2012

(54) MODIFIED SULFUR BINDER AND THE FABRICATION METHOD THEREOF, HYDRAULIC MODIFIED SULFUR MATERIAL COMPOSITION AND THE FABRICATION METHOD THEREOF OR COMBUSTIBLE MODIFIED SULFUR MATERIAL COMPOSITION AND THE FABRICATION METHOD THEREOF CONTAINING THE MODIFIED SULFUR BINDER

(75) Inventor: Mun-Son Choe, Seoul (KR)

(73) Assignee: Hanmi E&C Co., Ltd., Seoul (KR)

( * ) Notice: Subject to any disclaimer, the term of this patent is extended or adjusted under 35 U.S.C. 154(b) by 0 days.

(21) Appl. No.: 13/122,396

(22) PCT Filed: Oct. 15, 2008

(86) PCT No.: PCT/KR2008/006086
§ 371 (c)(1),
(2), (4) Date: Apr. 1, 2011

(87) PCT Pub. No.: WO2010/044496
PCT Pub. Date: Apr. 22, 2010

(65) Prior Publication Data
US 2011/0197790 A1    Aug. 18, 2011

(51) Int. Cl.
*C08K 5/34* (2006.01)
*C04B 14/48* (2006.01)
(52) U.S. Cl. .......................................... 524/99; 106/644
(58) Field of Classification Search ............... 524/99
See application file for complete search history.

(56) References Cited

U.S. PATENT DOCUMENTS

| | | | |
|---|---|---|---|
| 4,290,816 A | 9/1981 | Ludwig et al. | |
| 4,311,826 A | 1/1982 | McBee et al. | |
| 4,332,912 A | 6/1982 | Albom | |
| 4,348,313 A | 9/1982 | McBee et al. | |
| 4,376,831 A * | 3/1983 | Woo .............................. | 501/140 |
| 4,391,969 A | 7/1983 | McBee et al. | |
| 2005/0268822 A1 | 12/2005 | Hashimoto | |

FOREIGN PATENT DOCUMENTS

| | | |
|---|---|---|
| JP | 55-49024 | 4/1980 |
| JP | 62-15274 | 1/1987 |
| JP | 02-025929 | 1/1990 |
| JP | 02-028529 | 1/1990 |
| JP | 2002-060481 | 2/2002 |
| JP | 2002-060491 | 2/2002 |
| JP | 2003-277108 | 10/2003 |
| JP | 2004-002112 | 1/2004 |
| JP | 2004-002113 | 1/2004 |
| KR | 10-2005-0026021 | 3/2005 |
| KR | 10-2005-0112311 | 11/2005 |
| KR | 10-2006-0034122 | 4/2006 |
| KR | 10-2006-0101878 | 9/2006 |
| KR | 10-2006-0112442 | 11/2006 |
| WO | WO 2004/011384 | 2/2004 |

OTHER PUBLICATIONS

Gregor et al., A New Approach to Sulfur Concrete; In New Uses of Sulfur-II; 1978, Advances in Chemistry.
International Search Report for PCT/KR2008/006086 mailed Jul. 3, 2009.
English language abstract of JP 62-015274.
English language abstract of JP 02-025929.
English language abstract of JP 02-028529.
English language abstract of JP 2003-277108.
English language abstract of JP 2002-060491.
English language abstract of KR 10-2006-0101878.
English language abstract of JP 2004-002113.
English language abstract of JP 2004-002112.
English language abstract of JP 2002-060481.
English language abstract of KR 10-2005-0112311.
English language abstract of KR 10-2005-0026021.
English language abstract of KR 10-2006-0112442.
English language abstract of KR 10-2006-003412.

* cited by examiner

*Primary Examiner* — Ling Choi
*Assistant Examiner* — Hui Chin
(74) *Attorney, Agent, or Firm* — Hershkovitz & Associates, LLC; Abraham Hershkovitz

(57) ABSTRACT

A modified sulfur binder capable of implementing a physical property of being re-melted at a temperature less than 100° C., by mixing sulfur with a heterocyclicamine or alkylamine-based modifier and a dicyclopentadiene-based modifier, and a fabrication method thereof. A hydraulic modified sulfur material composition capable of being mixed with water by adding a surfactant to the modified sulfur binder, and obtained by mixing aggregate and a hydraulic material to the modified sulfur binder, and a fabrication method thereof. A hydraulic modified sulfur material obtained by molding the hydraulic modified sulfur material composition, and a fabrication method thereof. A combustible modified sulfur material composition obtained by adding aggregate to the modified sulfur binder, and by selectively adding a filler to the modified sulfur binder, and a fabrication method thereof. A combustible modified sulfur material obtained by molding the combustible modified sulfur material composition, and a fabrication method thereof.

36 Claims, 6 Drawing Sheets

| | Melted shape | Shapes of melted materials after reaction with water |
|---|---|---|
| Products according to the conventional art |  |  |
| Products according to the present invention |  |  |

| | During combustion test using torch | After combustion test using torch |
|---|---|---|
| Products according to the conventional art |  |  |
| Products according to the present invention |  |  |

MODIFIED SULFUR BINDER AND THE FABRICATION METHOD THEREOF, HYDRAULIC MODIFIED SULFUR MATERIAL COMPOSITION AND THE FABRICATION METHOD THEREOF OR COMBUSTIBLE MODIFIED SULFUR MATERIAL COMPOSITION AND THE FABRICATION METHOD THEREOF CONTAINING THE MODIFIED SULFUR BINDER

TECHNICAL FIELD

The present invention relates to a modified sulfur binder having a physical property of being re-melted at a temperature less than 100° C. and a fabrication method thereof, an incombustible hydraulic modified sulfur material composition containing the modified sulfur binder and a fabrication method thereof, and a combustible modified sulfur material composition containing the modified sulfur binder and a fabrication method thereof.

BACKGROUND ART

Generally, concrete fabricated by using portland cement has alkalinity, and is very susceptible to acidity. This concrete is mainly degraded by a chemical reaction. The most representative degradation of the concrete is corrosion due to salt damage or neutralization. Especially, a concrete structure exposed to salt damage environments may be early degraded due to corrosion of reinforced steel. Works to prevent the degradation of the concrete structure and to reinforce the concrete structure are generally performed by laminating epoxy or reinforcing glass mat to each other. This may cause operating time and material costs to be increased.

In order to solve the weak chemical resistance and strength of the concrete, has been developed a modified sulfur concrete technique capable of using modified sulfur materials rather than portland cement as a binder, and capable of fabricating mortar or concrete by mixing the modified sulfur binder with each kind of aggregate. In the case of using the modified sulfur binder, water is not used due to characteristics of the modified sulfur concrete, but a melted material obtained by melting modified sulfur is used.

However, the modified sulfur concrete has limited applicable ranges due to underwater freezing and thawing resistance, surface concavity due to a temperature difference between inside and outside of a test piece due to a rapid cooling after pouring, preheating of aggregate or a mould, susceptibility to fire, etc.

According to the current techniques, the modified sulfur concrete has to be used under the earth, under the sea, and under water. These limited applicable ranges may cause the modified sulfur concrete not to be universally used as materials for construction.

More concretely, have been continuously developed techniques for applying sulfur to civil engineering works and construction fields, by using characteristics of the sulfur having a melting point of 119° C. and having a solid phase at a room temperature. For instance, the sulfur is considered to be used as a binder such as packaging materials (U.S. Pat. No. 4,290,816), construction materials (Japanese Patent Publication No. 55-49024), or waste solidification materials (Japanese Patent Publication No. 62-15274), etc. With respect to combustibility, the sulfur has a flash point of 207° C. and a spontaneous combustion temperature of 245° C. Accordingly, the sulfur has an ignition quality, and may be easily burned when exposed to outside. With respect to a mechanical strength, the sulfur has a high strength when there is no defection in a stable solid state.

However, when solidified by cooling from a liquid state, the sulfur is in a mixed state among three types of an orthorhombic system, a monoclinic crystal, and amorphous sulfur. And, the sulfur has a mixing ratio changed according to cooling conditions, and has defections or brittleness as time lapses. This may result in very limited applicable ranges of the sulfur in the case of using pure sulfur as a binder. In order to solve the problems, various types of sulfur modifiers have been researched.

Especially, dicyclopentadiene (DCPD) is cheap, and has a good mechanical strength as disclosed in New Uses of Sulfur-11, 1978, PP. 68-77, 1978.

Japanese Patent Publication Nos. 2-25929 and 2-28529 have disclosed a method capable of improving properties and shapes of sulfur by adding vinyl toluene, dipentene, and olefin oligomer to the sulfur, and utilizing the sulfur as packaging materials, adhering materials, waterproofing materials, etc.

Japanese Patent Laid-Open No. 2003-277108 has disclosed tetra hydraulic indene as a sulfur modifier. And, Japanese Patent Laid-Open No. 2002-60491 has disclosed dicyclopentadiene and tetra hydraulic indene as a sulfur modifier. Actually, mixed materials between asphalt and sulfur are used as road packaging materials.

Generally, a reaction between dicyclopentadiene and sulfur may be considered as a polymerization reaction, and a relevant reaction mechanism has been disclosed in U.S. Pat. No. 4,311,826. In order to fabricate modified sulfur, dicyclopentadiene and sulfur are chemically reacted at an initial stage, and then the sulfur is changed into high molecular compounds by a radical chain reaction.

However, the continuous reaction between dicyclopentadiene and sulfur results in high heat emission, thereby being controlled with difficulty due to increased temperature and viscosity of the two materials. Furthermore, the dicyclopentadiene and sulfur can not be molded due to drastic solidification at a room temperature.

In order to solve the problems, the U.S. Pat. No. 4,311,826 has disclosed a technique capable of reacting sulfur with 20~40% by weight of a modifier (a binder of oligomer mixture composed of at least terpolymer of dicyclopentadiene and cyclo pentadiene). Japanese Patent Publication No. 2-28529 and U.S. Pat. No. 4,391,969 disclose a modified sulfur binder, respectively, composed of high polymers obtained by reacting sulfur with 2-20% by weight of a binder (binder containing dicyclopentadiene-oligomer mixture and dicyclopentadiene). Here, at least 37% by weight of cyclo pentadiene oligomer is required to be added to the binder. Korean Patent Laid-Open No. 2006-101878 has disclosed a method for fabricating a modified sulfur binder having an excellent storage stability in a liquid state by controlling less than 2~4% by weight of additives when exclusively using dicyclopentadiene not containing oligomer more than terpolymer as a binder.

The aforementioned techniques are used to fabricate sulfur concrete or sulfur asphalt by two methods. According to a first method for fabricating sulfur concrete or sulfur asphalt, a modified sulfur binder, a reaction product obtained by melt-mixing dicyclopentadiene and oligomer serving as a binder with sulfur at 120~160° C., is cooled at a room temperature less than 120° C. to be solidified, and then the modified sulfur binder is re-melted in a specific mixer having a temperature of 120-160° C. Then, the preheated aggregate and additives are simultaneously mixed with the modified sulfur binder as soon as possible, and the mixture is introduced into a preheated mould (or a molding machine) thus to be solidified by cooling.

According to a second method for fabricating sulfur concrete or sulfur asphalt, sulfur, a binder, and aggregate is simultaneously melt-mixed in specific conditions, and then the mixture is cooled.

However, the methods for fabricating a modified sulfur binder have the following problems.

Firstly, the modified sulfur binder re-melted to be mixed with aggregate for fabrication of concrete continuously undergoes a polymerization process even at 120-160° C., thereby having an increased viscosity. This may cause the fabrication processes not to be smoothly performed.

Secondly, when melt-mixing time of the modified sulfur binder in the mixer is too short, the modified sulfur binder is not sufficiently mixed with the aggregate. This may cause the resulting mixture to have holes or a rough surface in a non-consecutive manner.

Thirdly, when a melted mixture has a lowered temperature, the fluidity is degraded and the operation is not smoothly performed. This may cause drastic solidification of the melted mixture by cooling. In order to prevent this problem, the melt-mixing time has to be short within an allowance range of a physical property of fabricated sulfur concrete.

According to the conventional method, sulfur and dicyclopentadiene are reacted with each other to fabricate a modified sulfur binder in a solid phase, and then the modified sulfur binder is mixed with aggregate to fabricate concrete, etc.

All the fabricated modified sulfur binders, or materials for civil engineering and construction containing the modified sulfur binders have cheaper fabrication costs than cement, and have excellent physical properties such as high strength, high chemical resistance, and a hardened characteristic at a high speed. However, all the fabricated modified sulfur binders or materials have to be used under the earth, under the sea, and under water due to susceptibility to fire. These limited applicable ranges may cause the modified sulfur binders not to be universally used as materials for construction.

Japanese Patent Laid-Open Nos. 2003-277108 and 2004-2113 have disclosed modified sulfur concrete having more excellent stability than pure sulfur concrete as a test result of fire retardancy or ignition quality. However, the modified sulfur concrete corresponding to polymer concrete is ignited within a short time when contacting a large heat source such as fire, thus to lost functions as a concrete structure. This may cause large catastrophes such as earthquake to consecutively occur.

DISCLOSURE OF THE INVENTION

Therefore, it is an object of the present invention to provide (1) a modified sulfur binder and a fabrication method thereof capable of implementing a physical property of being re-melted at a temperature less than 100° C., a temperature to evaporate water (e.g., 35-70° C.) by mixing a heterocyclic or alkylamine compound, serving as a novel sulfur modifier, with a dicyclopentadiene-based modifier, (2) a method capable of completely solving the modified sulfur binder having hydrophobic, by using a surfactant, under water having a temperature less than 100° C., (3) a hydraulic modified sulfur material composition (e.g., hydraulic modified sulfur mortar or hydraulic modified sulfur concrete having non-combustibility) obtained by mixing aggregate and hydraulic materials with a modified sulfur binder solution including the modified sulfur binder, the surfactant, and the water, and a fabrication method thereof, and (4) a combustible modified sulfur material composition including the modified sulfur binder and aggregate.

To achieve these and other advantages and in accordance with the purpose of the present invention, as embodied and broadly described herein, there is provided (1) a modified sulfur binder, comprising: sulfur; 0.1-100% by weight of a dicyclopentadiene-based modifier based on 100% by weight of the sulfur, serving as a modifier of the sulfur; and 0.01-200% by weight of a heterocyclicamine or alkylamine-based modifier based on 100% by weight of the sulfur, serving as a modifier of the sulfur, wherein the sulfur and the modifiers are melt-mixed with each other.

To achieve these and other advantages and in accordance with the purpose of the present invention, as embodied and broadly described herein, there is also provided (2) a method for fabricating a modified sulfur binder, wherein a liquid modified sulfur binder is fabricated by melt-mixing sulfur with 0.1-100% by weight of a dicyclopentadiene-based modifier based on 100% by weight of the sulfur, and 0.01-200% by weight of a heterocyclicamine or alkylamine-based modifier based on 100% by weight of the sulfur, at 120-160° C.

To achieve these and other advantages and in accordance with the purpose of the present invention, as embodied and broadly described herein, there is also provided (3) a hydraulic modified sulfur material composition, comprising: a modified sulfur binder obtained by melt-mixing sulfur with 0.1-100% by weight of a dicyclopentadiene-based modifier based on 100% by weight of the sulfur, and 0.01-200% by weight of a heterocyclicamine or alkylamine-based modifier based on 100% by weight of the sulfur; 0.01-50% by weight of a surfactant based on 100% by weight of the modified sulfur binder; 100-9900% by weight of a hydraulic material based on 100% by weight of the modified sulfur binder; 15-70% by weight of water based on 100% by weight of a mixture between the modified sulfur binder and the hydraulic material; and 80-400% by weight of aggregate based on 100% by weight of the mixture between the modified sulfur binder and the hydraulic material.

To achieve these and other advantages and in accordance with the purpose of the present invention, as embodied and broadly described herein, there is also provided (4) a hydraulic modified sulfur material, comprising: a modified sulfur binder obtained by melt-mixing sulfur with 0.1-100% by weight of a dicyclopentadiene-based modifier based on 100% by weight of the sulfur, and 0.01-200% by weight of a heterocyclicamine or alkylamine-based modifier based on 100% by weight of the sulfur; 0.01-50% by weight of a surfactant based on 100% by weight of the modified sulfur binder; 100-9900% by weight of a hydraulic material based on 100% by weight of the modified sulfur binder; and 80-400% by weight of aggregate based on 100% by weight of a mixture between the modified sulfur binder and the hydraulic material.

To achieve these and other advantages and in accordance with the purpose of the present invention, as embodied and broadly described herein, there is also provided (5) a method for fabricating a hydraulic modified sulfur material composition, comprising: fabricating a liquid modified sulfur binder by melt-mixing sulfur with 0.1-100% by weight of a dicyclopentadiene-based modifier based on 100% by weight of the sulfur, and 0.01-200% by weight of a heterocyclicamine or alkylamine-based modifier based on 100% by weight of the sulfur, at 120~160° C.; obtaining a solid modified sulfur binder by cooling the liquid modified sulfur binder at a maximum temperature of 120° C.; and fabricating a hydraulic modified sulfur material composition by mixing a surfactant, a hydraulic material, water, and aggregate with the solid modified sulfur binder which is in a melted state at a maximum temperature of 100° C.

To achieve these and other advantages and in accordance with the purpose of the present invention, as embodied and broadly described herein, there is also provided (6) a method for fabricating a hydraulic modified sulfur material, wherein a hydraulic modified sulfur material is fabricated by cooling the hydraulic modified sulfur material composition fabricated by the method (5).

To achieve these and other advantages and in accordance with the purpose of the present invention, as embodied and broadly described herein, there is also provided (7) a combustible modified sulfur material composition, comprising: sulfur; a modified sulfur binder obtained by melt-mixing the sulfur with 0.1-100% by weight of a dicyclopentadiene-based modifier based on 100% by weight of the sulfur, and 0.01-200% by weight of a heterocyclicamine or alkylamine-based modifier based on 100% by weight of the sulfur; and 80-400% by weight of aggregate based on 100% by weight of the modified sulfur binder.

To achieve these and other advantages and in accordance with the purpose of the present invention, as embodied and broadly described herein, there is also provided (8) a method for fabricating a combustible modified sulfur material composition, comprising: fabricating a liquid modified sulfur binder by melt-mixing sulfur with 0.1-100% by weight of a dicyclopentadiene-based modifier based on 100% by weight of the sulfur, and 0.01-200% by weight of a heterocyclicamine or alkylamine-based modifier based on 100% by weight of the sulfur, at 120~160° C.; and fabricating a liquid modified sulfur material composition by melt-mixing the liquid modified sulfur binder with 80-400% by weight of aggregate based on 100% by weight of the liquid modified sulfur binder, at a maximum temperature of 100° C.

To achieve these and other advantages and in accordance with the purpose of the present invention, as embodied and broadly described herein, there is also provided (9) a method for fabricating a combustible modified sulfur material composition, comprising: fabricating a liquid modified sulfur binder by melt-mixing sulfur with 0.1-100% by weight of a dicyclopentadiene-based modifier based on 100% by weight of the sulfur, and 0.01~200% by weight of a heterocyclicamine or alkylamine-based modifier based on 100% by weight of the sulfur, at 120-160° C.; fabricating a solid modified sulfur binder by cooling the liquid modified sulfur binder at a maximum temperature of 120° C.; and fabricating a liquid modified sulfur material composition by melting the solid modified sulfur binder at a maximum temperature of 100° C., and then by mixing the melted modified sulfur binder with 80~400% by weight of aggregate based on 100% by weight of the melted modified sulfur binder.

To achieve these and other advantages and in accordance with the purpose of the present invention, as embodied and broadly described herein, there is also provided (10) a method for fabricating a combustible modified sulfur material composition, comprising: fabricating a liquid modified sulfur material composition by simultaneously melt-mixing sulfur with 0.1~100% by weight of a dicyclopentadiene-based modifier based on 100% by weight of the sulfur, 0.1-200% by weight of a heterocyclicamine or alkylamine-based modifier based on 100% by weight of the sulfur, and 80-400% by weight of aggregate based on 100% by weight of a total mixture among the sulfur, the dicyclopentadiene-based modifier, and the heterocyclicamine or alkylamine-based modifier, at 120-160° C. for 0.01-3 hours.

To achieve these and other advantages and in accordance with the purpose of the present invention, as embodied and broadly described herein, there is also provided (11) a method for fabricating a combustible modified sulfur material, comprising, wherein a combustible modified sulfur material is obtained by cooling the liquid modified sulfur material composition fabricated by one of (8) to (10). The present invention has the following advantages. Firstly, can be provided a modified sulfur binder having a physical property of being re-melted at a temperature less than 100° C., a temperature to evaporate water (e.g., 35~70° C.), by mixing a heterocyclicamine or alkylamine-based modifier that has not been conventionally used as a sulfur modifier, with a dicyclopentadiene-based modifier.

Secondly, the modified sulfur binder having hydrophobic can be completely solved, by using a surfactant, under water having a temperature less than 100° C.

Thirdly, can be provided a hydraulic modified sulfur material composition (e.g., hydraulic modified sulfur mortar or hydraulic modified sulfur concrete having non-combustibility), by mixing aggregate and a hydraulic material with a modified sulfur binder aqueous solution including the modified sulfur binder, the surfactant, and the water. When compared with the conventional modified sulfur binder, the modified sulfur binder of the present invention has the same or more advantages in respect of high strength, high chemical resistance, a hardened characteristic at a high speed, etc. And, the modified sulfur binder of the present invention can be mixed with concrete at a room temperature due to its hydraulic characteristic. Since the modified sulfur binder of the present invention is not combustible like ordinary concrete, it can be used in all the fields to which ordinary concrete is applied, and can be used as a waste solidification material. Especially, the modified sulfur binder can be fabricated by using warm water having a temperature of 35~70° C., for example, and can be used anywhere including under the earth, under the sea, and under water. Fourthly, works can be performed at a comparatively low temperature of about 60~85° C. by providing a combustible modified sulfur material composition including the modified sulfur binder and aggregate. Accordingly, the works can be performed even in winter, and a molding process can be performed without preheating a mould.

MODES FOR CARRYING OUT THE PREFERRED EMBODIMENTS

Figure 1:
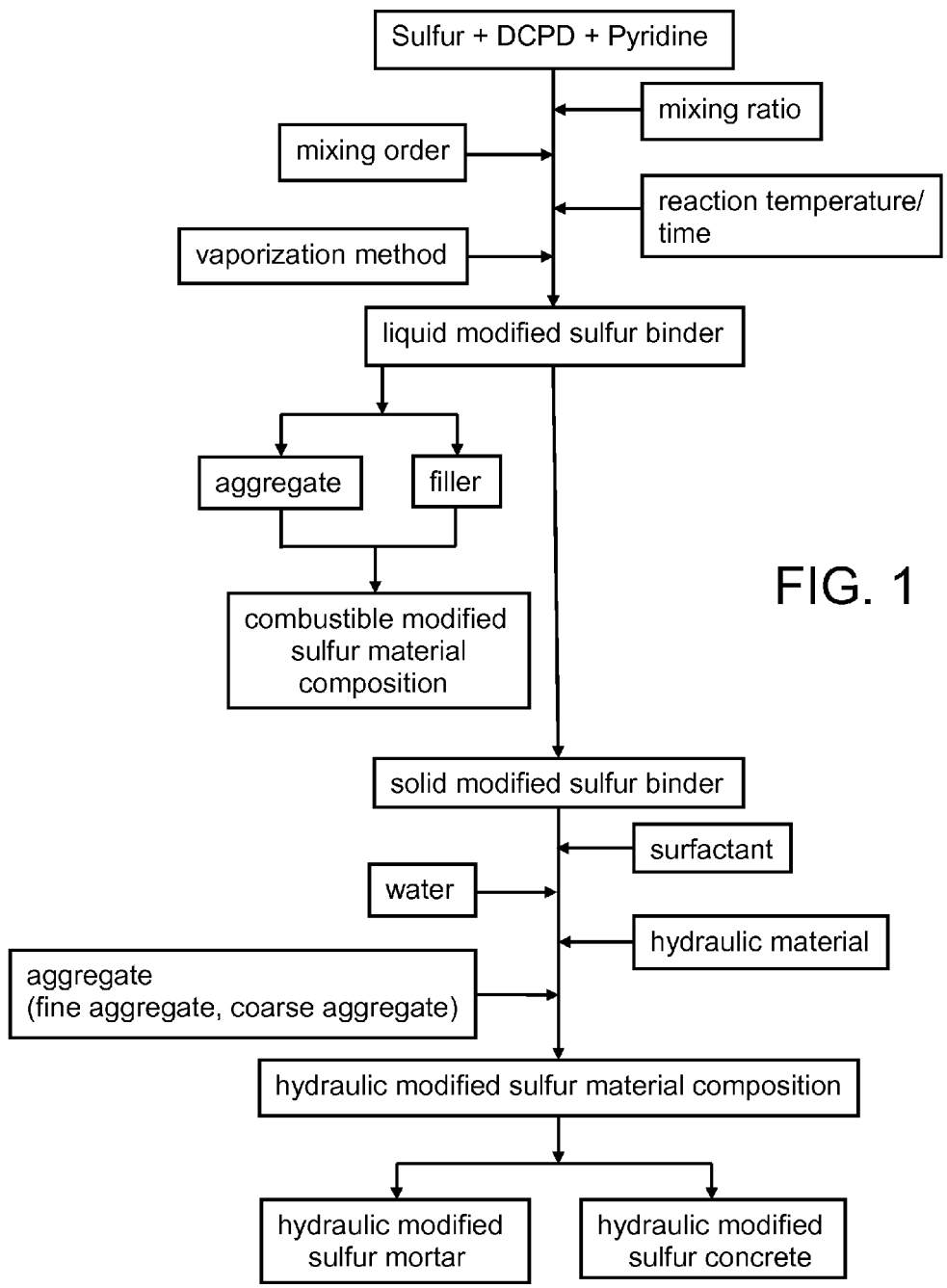
FIG. 1 is a flowchart showing a method for fabricating a hydraulic modified sulfur material composition according to the present invention.

Reference will now be made in detail to the preferred embodiments of the present invention, examples of which are illustrated in the accompanying drawings.

Hereinafter, preferred embodiments of the present invention will be explained in more detail.

The term of 'hydraulic' used in a hydraulic material, a hydraulic modified sulfur material composition, hydraulic modified sulfur mortar, or hydraulic modified sulfur concrete, etc. indicates inorganic materials or compounds with inorganic materials which form hydrate by a chemical reaction with water and exhibiting a solidified state and strength. The term of 'hydraulic' may be specified in KS L 0005 (standardized term of hydraulic cement) which expresses the definition of 'cement materials or hydration materials'. Here, the reaction may occur even under water. More concretely, when a modified sulfur binder is mixed with a hydraulic material and water, the mixture is hardened at a room temperature after a chemical reaction. The mixture exhibits strength, and is finally fabricated as a hardened material with a high density.

The term of 'combustible' used in a combustible modified sulfur material composition, combustible modified sulfur mortar, or combustible modified sulfur concrete, etc. of the present invention means a physical property liable to catch fire and burn readily.

The term of 'modified sulfur binder' signifies both a liquid modified sulfur binder and a solid modified sulfur binder. Here, the liquid modified sulfur binder is obtained by melt-mixing sulfur with a modifier of the sulfur, i.e., a heterocyclicamine or alkylamine-based modifier and a dicyclopentadiene-based modifier. And, the solid modified sulfur binder is obtained by cooling the liquid modified sulfur binder to a temperature less than 120° C., i.e, a room temperature.

The term of 'hydraulic modified sulfur material' of the present invention may be variously defined. According to an academic expression based on a fabrication method, the 'hydraulic modified sulfur material' means a hydraulic material obtained by mixing a modified sulfur binder with a surfactant, water, a hydraulic material, and aggregate at a temperature less than 100° C., and by solidifying the mixture by cooling in the air. However, the 'hydraulic modified sulfur material' generally means all types of materials being currently used in civil engineering and construction fields. For instance, the hydraulic modified sulfur material may include hydraulic modified sulfur mortar or hydraulic modified sulfur concrete.

In the present invention, aggregate used to be mixed with the modified sulfur binder includes both fine aggregate and coarse aggregate. Only fine aggregate is used to fabricate modified sulfur mortar, whereas both fine aggregate and coarse aggregate are used to fabricate modified sulfur concrete.

The term of 'filler' of the present invention means one of mortar and concrete that can replace a modified sulfur binder to a specific level. The filler serves to fill minute air gaps inside a modified sulfur hardened body. As the filler, fine materials such as fly-ash should be used to prevent a phenomenon that a surface of the modified sulfur hardened body is concaved due to degradation of filling effect with densification.

The sulfur used in the present invention is a sulfur monomer, and includes natural sulfur, or sulfur formed by desulfurizing oil or natural gas, or melted sulfur formed by melting sulfur at 125~140° C. The modifier used to modify sulfur in the present invention includes a heterocyclicamine or alkylamine-based modifier, and a dicyclopentadiene (DCPD)-based modifier.

As disclosed in Korean Patent Laid-Open No. 10-2006-101878, the dicyclopentadiene-based modifier includes dicyclopentadiene (DCPD) as a modifying component. As the DCPD, DCPD and/or a polymer thereof (including oligomer of the DCPD) may be exclusively used. As the DCPD, may be also used a mixture obtained by mixing the DCPD with at least one of cyclo pentadiene (CPD) and a polymer thereof (including oligomer of the CPD), DCPD derivatives (e.g., methyl cyclo pentadiene: MCP), and CPD derivatives (e.g., methyl dicyclopentadiene: MDCP). For instance, the dicyclopentadiene-based modifier may include about 65~75% by weight of DCPD, about 10-20% by weight of CPD, about 10-20% by weight of derivatives thereof (MCP, MDCP, etc.), and about 0.1-1.5% by weight of other components. The dicyclopentadiene-based modifier may be used in a mixed state with olefin compounds such as dipentene, vinyl toluene, styrene monomer, and dicyclo pentene. As disclosed in Japanese Patent Publication No. 2002-60491 and Korean Patent Laid-Open No. 10-2005-26021, the dicyclopentadiene-based modifier preferably contains about 70% by weight of DCPD ('purity 70%') or more than. And, products referred to as dicyclopentadiene may be used as the dicyclopentadiene-based modifier.

As the modified sulfur binder of the present invention, heterocyclicamine or alkylamine-based modifier was newly introduced. The heterocyclicamine-based modifier may include pyridine or polymer thereof (including oligomer of the pyridine), homologues of the pyridine, isomers of the pyridine, isomers of the homologues of the pyridine, quinoline, isoquinoline, acridine, or pyrrole, etc. Here, a homogeneous material, or hetero materials more than two types may be used. The pyridine exists in coal-tar light oil in a large amount together with picoline and lutidine that are homologues thereof. In industrial fields, the pyridine is a heterocyclic compound made from a pyridine base, homologues thereof, which is odorous liquid having no color, a molecular amount of 79.10, a melting point of −42° C., a boiling point of 115.5° C., and a weight of 0.9779 (25° C.). Derivatives of the pyridine are synthesized by Hantzsch synthesis, and include each kind of pyridine carboxyl acid, pyridine sulfonic acid, pyridine aldehyde, etc. picoline having a similar physical property to the pyridine is called as methylpyridine, and three types of hetero materials (e.g., 2-methylpyridine, 3-methylpyridine and 4-methylpyridine) according to a position of a methyl group. And, lutidine includes six types of hetero materials such as (2, 3), (2, 4), (2, 5), (2, 6), (3, 4) and (3, 5). However, the heterocyclicamine-based modifier of the present invention is not limited to the above materials.

In the present invention, a liquid modified sulfur modifier can be fabricated by mixing sulfur with a heterocyclicamine or alkylamine-based modifier and a dicyclopentadiene-based modifier. More concretely, the sulfur is polymerized by being melt-mixed with the sulfur modifier at 120~160° C., thereby fabricating liquid modified sulfur binder. In the present invention, based on 100% by weight of the sulfur, 0.1~100% by weight of the dicyclopentadiene-based modifier is mixed with the sulfur, 1-70% by weight of the dicyclopentadiene-based modifier is preferably mixed with the sulfur, and 1-40% by weight of the dicyclopentadiene-based modifier is more preferably mixed with the sulfur. And, based on 100% by weight of the sulfur, 0.01-200% by weight, preferably 0.01-

100% by weight, and more preferably 0.1-30% by weight of the heterocyclicamine or alkylamine-based modifier are mixed with the sulfur.

Since the objects of the present invention are different from those of the conventional art, the dicyclopentadiene-based modifier of the present invention is mixed with the sulfur with a larger amount than that of the conventional art.

More concretely, the conventional art (Japanese Patent Publication No. 2002-60491) discloses a modified sulfur binder having a viscosity range of 20-500 nn Pa·s. The reasons why the modified sulfur binder has the most preferable viscosity range of 20-500 m Pa·s are as follows. Even if a liquid resultant (modified sulfur binder) having completely undergone a polymerization process is in a stored state inside a storage tank, the modified sulfur binder continuously undergoes a polymerization process within a reaction temperature range when fabricating the resultant (modified sulfur binder). Accordingly, the modified sulfur binder is changed into a visco-elastic material such as rubber to cause serious damage to the storage tank. Therefore, the modified sulfur binder is set to have a low viscosity so as to prevent or retard a reaction when being stored in the storage tank for a long time, thereby maintaining a stable and constant viscosity. According to the conventional techniques, 0.01-30% by weight of a dicyclopentadiene-based modifier is added to sulfur (Japanese Patent Publication No. 2004-2112), 2-50% by weight of a dicyclopentadiene-based modifier is added to sulfur (Japanese Patent Publication No. 2002-60491), and 2-4% by weight of a dicyclopentadiene-based modifier is added to sulfur (Korean Patent Laid-Open No. 2006-101878).

In the conventional patents, each weight of dicyclopentadiene-based modifiers are added to sulfur to be melted at 125-140° C. Then, the time when a reaction resultant has a viscosity of 15~1000 m Pa·s is considered as a reaction finishing time, and the reaction is drastically stopped at the reaction stopping time.

Characteristics of a sulfur-contained material such as fire retardancy and chemical-resistance may be improved by increasing an added amount of a dicyclopentadiene-based modifier to the sulfur-contained material. However, when 30% by weight of a dicyclopentadiene-based modifier is mixed with the sulfur-contained material, the improved effects are saturated. And, when more than 30% by weight of a dicyclopentadiene-based modifier is mixed with the sulfur contained material, little changes occur. The modified sulfur binder has the most excellent strength when 0.5-20% by weight of a dicyclopentadiene-based modifier is mixed with the sulfur-contained material. When more than 20% by weight of a dicyclopentadiene-based modifier is mixed with the sulfur-contained material, the resultant becomes a visco-elastic body due to increased elasticity. This may cause the molded article to be easily distorted and not to be easily fractured. Also, when more than 30% by weight of a dicyclopentadiene-based modifier is mixed with the sulfur-contained material, the resultant has a drastically increased viscosity not to be controlled. Accordingly, the added amount of the dicyclopentadiene-based modifier to the sulfur-contained material should be determined with consideration of the above features. More concretely, all the conventional U.S., Japan, and Canada patents have disclosed that a considerable amount (e.g., 37% by weight) of oligomer more than terpolymer of cyclo pentadiene is used, and a final product is configured to have a final viscosity of 20~500 m Pa·s measured at 140° C. with consideration of its strength or workability. Korean Patent Laid-Open No. 2006-101878 has disclosed that when about 3% by weight of dicyclopentadiene based on 100% by weight of a reactant is exclusively used, a modified sulfur binder stored at about 130° C. for two weeks in a liquid state has a viscosity of about 10~1000 cP tested by ASTM D4402, and more preferably has a viscosity of about 10~500 cP. When more than 4% by weight of dicyclopentadiene is used, a byproduct may be super-cooled not to be solidified within a short time. Therefore, in order to obtain a byproduct having a desired hardness, the liquid modifier sulfur binder has to be disposed for a long time at a temperature much lower than a melting point of sulfur, e.g., at a room temperature. In order to solve the problem, Korean Patent Laid-Open No. 2006-101878 has a technical feature to have a limited added amount of a dicyclopentadiene-based modifier to sulfur.

However, in the present invention, even if a liquid modified sulfur binder having a high viscosity is formed, it is cooled at a room temperature to be fabricated as a solid modified sulfur binder. Then, the solid modified sulfur binder Is dissolved under water having a temperature less than 100° C. when manufacturing a hydraulic modified sulfur material composition by additional processes. Accordingly, a final product need not be in a limited low viscosity range, and an added ratio of a dicyclopentadiene-based modifier to sulfur need not be limited to the conventional range. As an added ratio of a dicyclopentadiene-based modifier to sulfur is increased, a viscosity of a final product is continuously increased and reacting time is shortened. This may shorten fabricating time of the final product to increase efficiency in fabricating products. However, when too excessive amount of a dicyclopentadiene-based modifier is added to sulfur or an adding speed (a speed to drop a dicyclopentadiene-based modifier into a melted sulfur material) is too fast, an instantaneous and explosive heat emitting phenomenon occurs to cause a difficulty in controlling the reaction. Accordingly, it is preferable to determine a suitable added amount of a dicyclopentadiene-based modifier to sulfur with consideration of the various aspects.

With consideration of the various aspects, preferably used is a liquid modifier sulfur binder to cause a reaction product obtained just before finishing a reaction to have a final viscosity of 0.01-100.0 Pa·s at 140° C., preferably of 0.1-10.0 Pa·s. The viscosity of 0.01-100.0 Pa·s or 0.1-10.0 Pa·s has a much wider range than the conventional final viscosity of 20-500 m Pa·s measured at 140° C., but is suitable for the present invention.

In the present invention, a heterocyclicamine or alkylamine-based modifier is used to obtain a byproduct having a high viscosity.

Conventionally, a reaction of a byproduct having a high viscosity is not easily controlled. However, the present invention solves the conventional problem by changing an addition amount of a heterocyclicamine or alkylamine-based modifier to sulfur, mixing orders thereof, and vaporization methods.

The heterocyclicamine or alkylamine-based modifier implements physical properties by a reaction constraint or a viscosity controller when a dicyclopentadiene-based modifier is polymerized with sulfur, thereby changing various physical properties such as reaction conditions, a viscosity and cooling conditions of a reaction product, and odor removal. Especially, since the heterocyclicamine or alkylamine-based modifier is used, can be fabricated a solid modifier sulfur binder having a physical property to be re-melted at a temperature less than 100°, which is the most important technical feature of the present invention.

More concretely, all the conventional final products (modified sulfur binders) fabricated by the aforementioned patent techniques were observed not to implement a physical property to be re-melted at a temperature less than 100°, whereas a solid modified sulfur binder fabricated by using a heterocyclicamine or alkylamine-based modifier in the present invention was observed to implement a physical property to be re-melted at a temperature less than 100°. The reasons why the modified sulfur binder can be re-melted at a temperature less than 100° are as follows. As shown in a method for fabricating an incombustible hydraulic modified sulfur material composition that will be later explained, a modifier sulfur binder has to be mixed with a hydraulic material and water to be molded in order to fabricate a hydraulic modified sulfur material composition. Here, in order to implement an excellent characteristic with a little amount, the modified sulfur binder has to be melted at a temperature less than 100° C. to be mixed with water in a liquid state by using a surfactant.

As a comparative embodiment, the conventional modified sulfur binder was crushed into very fine particles, and a re-melting test was performed. As a result of the re-melting test, the modified sulfur binder was re-melted at an approximate temperature of 114° C. When the fine powder (about 100~200 mesh) was added to water having a temperature less than 100° C. (boiling water) with a surfactant in the same manner as the present invention, the powder was instantaneously changed into sediments upon contacting the water. Here, a homogenizer was used to disperse the sediments up to 20000 RPM to the maximum. However, the fine powder of the modified sulfur binder was not re-melted, but was dispersed in hot water together with a large amount of foam owing to crushing and dispersing functions of the homogenizer.

The fine powder of the modified sulfur binder was mixed with a hydraulic material, cement, and water, thereby fabricating modified sulfur cement. Then, the fabricated modified sulfur cement was put into an autoclave, a hydrothermal synthesizer used when fabricating a pre-cast product in the conventional cement field, and then was cured at 150° C. As a result, the modified sulfur powder minutely dispersed in the cement was combusted at the temperature of 150° C. to be carbonized. When fabricating modified sulfur cement by the conventional method, a maximum added amount of the fine modified sulfur powder was about 7% by weight, and about 3% by weight of the fine modified sulfur powder started to be carbonized. And, when more than 7% by weight of the fine modified sulfur powder was used, a byproduct was entirely carbonized.

Physical phenomena of the modified sulfur binder fabricated by the aforementioned methods were compared with those of the solid modified sulfur binder of the present invention, and test results thereof will be explained as follows.

More concretely, it was observed that a hydraulic modified sulfur material composition fabricated by the present invention were easily re-melted at a temperature less than 100° C., or at about 60° C., or at a temperature less than 60° C. And, according to another observation, when a solid modified sulfur binder disposed in a mixer was provided with a heating source of about 60° C., it was in a solution state not in a dispersed state. After being cured in the autoclave, the solid modified sulfur binder has not been carbonized, and showed very excellent physical properties in strength, absorption rate, etc.

A test piece fabricated by the conventional methods serves as a filler which is in a dispersed state without hydration characteristics. With comparing mixed amount changes when fabricating mortar, the test piece fabricated by the conventional methods scarcely influences on mixed amount changes. However, when fabricating a test piece according to the present invention, a modified sulfur binder is melted to be in a liquid state. Accordingly, in the case of mixing the modified sulfur binder with cement and water, large mixed amount changes occur according to added amount changes. And, as an observation result of a surface state of a test piece after pouring a test piece paste into a mould, the test piece of the present invention had a surface having a higher viscosity than that of the conventional art.

In the present invention, as a modifier or a reaction controller, 0.1~200% by weight of a heterocyclicamine or alkylamine-based modifier based on 100% by weight of sulfur was used, 0.01~100% by weight of a heterocyclicamine or alkylamine-based modifier based on 100% by weight of sulfur was preferably used, and 0.1-30% by weight of a heterocyclicamine or alkylamine-based modifier based on 100% by weight of sulfur was more preferably used. Here, when less than 0.01% by weight of a heterocyclicamine or alkylamine-based modifier is used, physical property effects corresponding to the modifier or reaction controller are not anticipated. And, when more than 200% by weight of a heterocyclicamine or alkylamine-based modifier is used, fabrication costs are increased and physical property effects corresponding to the modifier or reaction controller are not anticipated. When fabricating a liquid modified sulfur binder according to the present invention, mixing orders among sulfur, a dicyclopentadiene-based modifier, and a heterocyclicamine or alkylamine-based modifier are not limited. However, it is preferable to select a method the most suitable for a physical property of a final product among the following methods.

(a) A method for fabricating a liquid modified sulfur binder by heat-reacting sulfur and a dicyclopentadiene-based modifier, adding a heterocyclicamine or alkylamine-based modifier to the mixture, and applying heat to the mixture.

(b) A method for fabricating a liquid modified sulfur binder by mixing a dicyclopentadiene-based modifier with a heterocyclicamine or alkylamine-based modifier, mixing sulfur to the mixture, and applying heat to the mixture.

(c) A method for fabricating a liquid modified sulfur binder by heat-reacting sulfur and a heterocyclicamine or alkylamine-based modifier, adding a dicyclopentadiene-based modifier to the mixture, and applying heat to the mixture.

(d) A method for fabricating a liquid modified sulfur binder by heat-reacting sulfur and a dicyclopentadiene-based modifier and cooling the reactant to obtain a solid reactant, re-melting the solid reactant, adding a heterocyclicamine or alkylamine-based modifier to the re-melted solid reactant, and applying heat to the mixture.

According to the method of (a), sulfur and a dicyclopentadiene-based modifier are polymerized with each other, and a heterocyclicamine or alkylamine-based modifier is added to the mixture according to the conventional fabricating orders. In the method of (a), a relatively small amount of heterocyclicamine or alkylamine-based modifier is added. And, in order to enhance a physical property of a final product, a reaction product is configured to maintain a viscosity range of 0.01-10.0 Pa·s, more preferably, 0.1~4.0 Pa·s when adding a heterocyclicamine or alkylamine-based modifier to the mixture.

According to the method of (b), a heterocyclicamine or alkylamine-based modifier serving as a modifier or a reaction controller is added to a dicyclopentadiene-based modifier before a polymerization reaction. This may prevent a reactant from having drastic viscosity increase, and allow the polymerization reaction to be smoothly performed, thereby easily controlling the reaction.

According to the method of (c), a heterocyclicamine or alkylamine-based modifier is directly reacted with sulfur, a dicyclopentadiene-based modifier is added to the reactant, and heat is applied to the mixture. The present inventor has observed that a polymerization reaction occurred by directly reacting a heterocyclicamine or alkylamine-based modifier with sulfur.

According to the method of (d), a stabilized modified sulfur binder is fabricated and then is re-melted. The modified sulfur binder is in a stably stored state in the form of flakes before reaction.

In the present invention, preferably, sulfur and a dicyclopentadiene-based modifier are melt-mixed with a heterocyclicamine or alkylamine-based modifier. And, the heterocyclicamine or alkylamine-based modifier is preferably vaporized within a viscosity range of a reaction product, 0.01~100.0 Pa·s, more preferably, 0.1~10.0 Pa·s. The heterocyclicamine or alkylamine-based modifier is vaporized so as to easily deal with a reaction resultant (in hardness), to remove odor of aromatic thereof, and to enhance strength and stability of a final product, etc.

As a reaction mixer used to melt-mix the reactants, any conventional reaction mixer capable of smoothly performing a mixing process may be used, and a mixer for stirring liquid may be preferably used. When less than about 5% by weight of a heterocyclicamine or alkylamine-based modifier is used, a hermetic reactor may be used. However, when more than about 5% by weight of a heterocyclicamine or alkylamine-based modifier is used, a hermetic reactor is not be preferably used. The reasons are because the heterocyclicamine or alkylamine-based modifier has to be vaporized so as to have its odor removed, and so as to obtain a final product in a cake state having hardness.

In order to enhance a physical property of a final product, the heterocyclicamine or alkylamine-based modifier being currently heated has to be vaporized before and after a moment when a modified sulfur precursor is obtained, i.e., when a reaction product by a melt-mixing process has a viscosity of 0.01-100.0 Pa·s, more preferably, 0.1-10.0 Pa·s. Here, in order to more accurately measure a time point when a modified sulfur precursor is obtained, a distributed state of molecular amounts may be analyzed in a GPC measuring manner. However, this method may cause a difficulty in reaction processes that are being consecutively performed. Accordingly, it may be convenient to real time measure a viscosity of the final product by using a hakee viscometer. The reasons why the reaction product has a wide viscosity range at the suitable vaporization time point are because changes of mixing orders of the heterocyclicamine or alkylamine-based modifier, or methods for stabilizing the final product according to a physical property state of a final product are variously performed in wide conditions. That is, according to all the four methods (a, b, c and d) of fabricating a liquid modified sulfur binder, a final product has more enhanced stability in all physical properties when the heterocyclicamine or alkylamine-based modifier is vaporized than when the heterocyclicamine or alkylamine-based modifier is not vaporized.

All the conventional patents have disclosed that a reaction temperature and reaction time at the reaction temperature are very important factors to influence on all physical properties of a final product, a modified sulfur binder. Japanese Patent Publication No. 2003-277108 and Japanese Patent Publication No. 2002-60491 have disclosed that sulfur in a melted state is not easily transformed at a temperature less than 125° C. even when mixing with a sulfur modifier. And, at a temperature range of 120° C.~135° C., a polymerization reaction between sulfur and a sulfur modifier is slow, and gradual temperature increase and viscosity increase rather than drastic heat generation and viscosity increase occur, thereby allowing a modified sulfur binder to have a constant viscosity. Furthermore, an optimum temperature in an initial mixing process between sulfur and a sulfur modifier may depend on a type or added amount of the sulfur modifier. For instance, the Japanese Patent Publication No. 2003-277108 and Japanese Patent Publication No. 2002-60491 have disclosed that a practical reaction speed is obtained even at 130° C. when 20% by weight of a dicyclopentadiene-based modifier is added to 100% by weight of sulfur. However, it was disclosed that when less than 1% by weight of a dicyclopentadiene-based modifier is added to 100% by weight of sulfur, reaction time more than several hours is required.

A reaction temperature and reaction time of the present invention are similar to those of the conventional techniques. However, a novel material, a heterocyclicamine or alkylamine-based modifier, is firstly used in the present invention. Accordingly, big differences of the present invention from the conventional techniques may occur in respect of viscosity, strength and stability of a final product, removal of odor of aromatic of the heterocyclicamine-based or alkylamine-based modifier, a dealing characteristic of a reaction resultant, etc. according to changes of adding methods, adding time, added amount, and vaporization conditions, etc. of the heterocyclicamine or alkylamine-based modifier.

When compared with the conventional mechanism, the reaction between a dicyclopentadiene-based modifier and sulfur is a kind of polymerization reaction. And, a melt-mixing process, a core process for fabricating modified sulfur, serves to obtain modified sulfur by polymerizing sulfur by mixing melted sulfur and a sulfur modifier. A sulfur modifying process may be classified into an initial mixture reaction process for forming a modified sulfur precursor by reacting melted sulfur and a sulfur modifier, and a polymerization reaction process for consecutively reacting the formed modified sulfur precursor and the melted sulfur for polymerization. The modified sulfur forming reaction is composed of an initial mixing reaction process for exhibiting a drastic heat emitting reaction, and a polymerization reaction process for exhibiting a heat absorbing reaction. And, the modified sulfur forming system is converted into the heat absorbing reaction from the heat emitting reaction during the reaction. A heat emitting amount, a heat absorbing amount, and reaction time may be varied according to a type or added amount of a sulfur modifier. Here, the polymerization process may be congested and solidified unless a temperature control is precisely performed. In summary of the current researches for the 'sulfur-dicyclopentadiene-based modifier-heterocyclicamine or alkylamine-based modifier' used in the present invention, it was observed that a polymerization reaction occurred like in a 'sulfur-dicyclo penetadiene-based modifier' even when the eterocyclicamine or alkylamine-based modifier is exclusively reacted with the sulfur. And, it was also observed that a modified sulfur precursor was formed while a heat emitting reaction occurred in an initial mixing reaction process like a reaction mechanism of the 'sulfur-dicyclopentadiene-based modifier'. Here, when the reaction was continuously performed, a polymerization reaction occurred to stabilize all the physical properties of a final product, a modified sulfur binder, such as viscosity, strength, hardness, and stability.

Furthermore, when the heterocyclicamine or alkylamine-based modifier was vaporized, a reaction resultant was easily dealt, odor of aromatic of the heterocyclicamine or alkylamine-based modifier was removed, and all the physical properties of a final product, such as stability, were stabilized. In order to enhance the physical properties of the final product, the heterocyclicamine or alkylamine-based modifier being currently heated has to be vaporized before and after a moment when a modified sulfur precursor is formed, i.e., when a reaction product has a viscosity of 0.01-100.0 Pa·s, more preferably, 0.1-10.0 Pa·s. It was proved that various methods for stabilizing a final product could be performed in wide conditions according to mixing order changes of a heterocyclicamine or alkylamine-based modifier, or a physical property of the final product.

In the present invention, a modified sulfur material composition and a modified sulfur material were fabricated according to the following steps by using the liquid modified sulfur binder fabricated by the aforementioned method.

(a) A combustible modified sulfur mortar and concrete composition fabricated by selectively mixing aggregate and a filler with a liquid modified sulfur binder without water, and combustible modified sulfur mortar and concrete fabricated by molding and then cooling the same.

(b) A solid modified sulfur binder fabricated by cooling a liquid modified sulfur binder at a temperature less than 120° C., below a reaction temperature.

(c) A combustible modified sulfur mortar and concrete composition fabricated by re-melting the solid modified sulfur binder obtained in the step of (b) at a temperature less than 100° C., and then by selectively mixing aggregate and a filler with the solid modified sulfur binder without water, and combustible modified sulfur mortar and concrete fabricated by molding and then cooling the same.

(d) A hydraulic modified sulfur mortar composition and a hydraulic modified sulfur concrete composition fabricated by mixing a surfactant, water, a hydraulic material, and aggregate with the solid modified sulfur binder obtained in the step of (b), and hydraulic modified sulfur mortar and hydraulic modified sulfur concrete fabricated by molding and then cooling the same.

(e) A combustible modified sulfur mortar composition and a combustible modified sulfur concrete composition fabricated by simultaneously melt-mixing sulfur with a dicyclopentadiene-based modifier, a heterocyclicamine or alkylamine-based modifier, and aggregate at 120-160° C. for 0.01~3 hours, and combustible modified sulfur mortar and combustible modified sulfur concrete fabricated by molding and then cooling the same.

As shown in the step of (b), the solid modified sulfur binder may be obtained by cooling a liquid modified sulfur binder at a temperature less than 120° C., below a reaction temperature. The cool-solidification may be performed by a cooling process at a temperature where a solidification process can be performed. Here, the cool-solidification may include a cool-solidification method for performing a cool-solidification process by putting a material into a mould, a cool-solidification method for performing a cool-solidification process by putting a material into a mould having any shape and performing vibration filling, a cool-solidification method for performing a cool-solidification process by performing assembly with using an assembly device, etc. However, the present invention is not limited to the above methods, but may be utilize any motor type devices having drums or inclined lines, or any vibration type devices having horizontal or inclined pipes.

The combustible modified sulfur means a modified sulfur material that can easily burn at about 130° C. like the conventional one. And, the hydraulic modified sulfur material means a material such as ordinary cement mortar or concrete that can not burn even in fire using torch. One of the final purposes of the present invention is to fabricate a hydraulic modified sulfur material composition and hydraulic modified sulfur material having incombustibility, which may be achieved by using the fabrication processes shown in FIG. 1.

Firstly, sulfur, a dicyclopentadiene-base d modifier, a heterocyclicamine-based (e.g., pyridine or oligomer thereof) or alkylamine-based modifier are melt-mixed with one another, thereby fabricating a liquid modified sulfur binder. In the present invention, a sulfur modifier, a heterocyclicamine or alkylamine-based modifier, is newly used together with a dicyclopentadiene-based modifier, thereby fabricating a stable modified sulfur binder having physical properties equal to or more than those of the conventional one. The fabricated modified sulfur binder exhibits a physical property of being re-melted at a temperature less than 100° C., a temperature to evaporate water, thereby enabling a mixing process with mortar or concrete at a temperature less than 100° C. according to subsequent processes. Based on 100% by weight of the sulfur, 0.1-100% by weight, preferably 1~70% by weight, and more preferably 1-40% by weight of the dicyclopentadiene-based modifier are mixed with the sulfur. And, based on 100% by weight of the sulfur, 0.01-200% by weight, preferably 0.01-100% by weight, and more preferably 0.1-30% by weight of the heterocyclicamine or alkylamine-based modifier are mixed with the sulfur. The melt-mixing process is preferably performed at 120-160° C. In the present invention, the types of the dicyclopentadiene (DCPD)-based modifier, the heterocyclicamine or alkylamine-based modifier, mixing orders, reaction temperatures and time, and a vaporization method for the heterocyclicamine or alkylamine-based modifier have been already aforementioned.

Then, the liquid modified sulfur binder is cooled to obtain a solid modified sulfur binder. Here, a temperature less than 120° C., below a reaction temperature is preferable as a cooling temperature.

Then, the solid modified sulfur binder in a melted state at a maximum temperature of 100° C. is mixed with a surfactant, a hydraulic material, water, and aggregate, thereby fabricating a hydraulic modified sulfur material composition. Since modified sulfur is a combustible polymer compound, an incombustible hydraulic inorganic material is added to the modified sulfur. Also, the obtained modified sulfur binder having no hydrophilicity is mixed with mortar or concrete under water having a temperature less than 100° C. by using a surfactant. The kinds of the addition materials and addition rates will be later explained.

Then, the hydraulic modified sulfur material composition is cooled to obtain a hydraulic modified sulfur material. Here, the cooling may be performed by a natural cooling method in the atmosphere.

In order to fabricate the hydraulic modified sulfur material (mortar or concrete) composition of the present invention, a solid modified sulfur binder is mixed with a surfactant, water, a hydraulic material, and aggregate at a temperature less than 100° C. Preferable addition amounts of the respective materials are shown as follows according to a mortar composition and a concrete composition.

(a) In the case of a hydraulic modified sulfur mortar composition, 0.01-50% by weight of a surfactant, preferably 0.1-10% by weight of a surfactant based on 100% by weight of the modified sulfur binder is added. 100-9900% by weight of a hydraulic material, preferably 700-900% by weight of a hydraulic material based on 100% by weight of the modified sulfur binder is added. 15-70% by weight of water, preferably 25-50% by weight of water based on 100% by weight of a mixture between the modified sulfur binder and the hydraulic material is added. And, 80-400% by weight of aggregate, preferably 100-200% by weight of aggregate based on 100% by weight of the mixture between the modified sulfur binder and the hydraulic material is added. (b) In the case of a hydraulic modified sulfur concrete composition, 0.01-50% by weight, preferably 0.1-10% by weight of a surfactant based on 100% by weight of the modified sulfur binder is added. 100-9900% by weight, preferably 700-900% by weight of a hydraulic material based on 100% by weight of the modified sulfur binder is added. 15-70% by weight, preferably 25-50% by weight of water based on 100% by weight of a mixture between the modified sulfur binder and the hydraulic material is added. And, 80-400% by weight, preferably 100-200% by weight of aggregate based on 100% by weight of the mixture between the modified sulfur binder and the hydraulic material is added. Here, the aggregate is obtained by mixing fine aggregate with coarse aggregate with a weight ratio of 1:0.1-1:4, preferably of 1:1-1:2.5. The surfactant may include a negative-ion surfactant such as soap and alkylbenzenesulfonic acid salts, a positive-ion surfactant such as a high level of amine halogen compounds, preparing quaternary ammonium compound (QAC) salts, and alkylpyridinium salts, a nonionic surfactant such as nonylphenol and octylphenol, and an amphoteric surfactant such as amino acid.

As the hydraulic material, may be used at least one selected from a group consisting of fly-ash, ordinary portland cement specified in KS L 5201, ground granulated blast furnace slag (GGBFS), silica fume, blast furnace slag cement, meta-kaolin or cement groups specified in KS L 0005 (standardized term in the field of hydraulic cement), calcium sulfate, and a mixture therebetween. The hydraulic material serves to provide incombustibility to a hydraulic modified sulfur material. Also, the hydraulic material serves as a filler to allow dense filling of a hydraulic modified sulfur material, and to prevent a concaved phenomenon of the hydraulic modified sulfur material. The aggregate may include any types of aggregate. However, recyclable industrial wastes may be preferably used, and homogeneous or hetero materials selected from a group consisting of river sand, crushed stone, fly ash, sea sand, quartz sand, pebbles, silica, quartz powder, light-weighted aggregate, clay minerals, and glass powder. Most preferably used is aggregate having a highest filling strength by a modified sulfur binder or a hydraulic material or a filler, under a state that the aggregate is in an optimum filling state.

When less than about 10% by weight of a modified sulfur binder is mixed with more than 90% by weight of aggregate, the surface of the aggregate, an inorganic-based material can not be soaked in water but is in an exposed state. Here, the aggregate neither sufficiently exhibits a strength, nor maintains dimensional characteristics. When more than about 60% by weight of a modified sulfur binder is mixed with less than 40% by weight of aggregate, an exclusive characteristic of the modified sulfur binder is exhibited and a strength is lowered. Preferably, 20~40% by weight of the modified sulfur binder is mixed with the aggregate. Mixing rates between the modified sulfur binder and the aggregate depend on the kinds of the aggregate. Therefore, it is preferable to select a suitable mixing rate within the above ranges. Based on 100% by weight of a mixture between the modified sulfur binder and the hydraulic material, may be further included 1-20% by weight of a homogeneous or hetero flexural strength reinforcement selected from a group consisting of reinforced steel, steel fiber, fiber filler, fibrous particles, fine particles, and a mixture between. In order to maximize applicable ranges to the present invention, based on 100% by weight of a mixture between the modified sulfur binder and the hydraulic material, may be further included 10-50% by weight of a homogeneous or hetero material selected from a group consisting of the conventional polymer cement group, polymer cement mortar group, and a mixture between. Based on 100% by weight of a mixture between the modified sulfur binder and the hydraulic material, may be further included 0.1-3% by weight of a homogeneous or hetero material selected from a group consisting of a water-reducing agent having a high performance to enhance the fluidity in a mixing process, an air entraining agent for durability for a long time, a hardening accelerator, a hardening retardant, or a set accelerating agent for controlling a hardening time, and a mixture between. And, based on 100% by weight of a mixture between the modified sulfur binder and the hydraulic material, may be further included 0.1-3% by weight of materials such as pigments for aesthetic effects and deodorants for removing odor. As a mixer used to fabricate the hydraulic modified sulfur mortar or concrete composition, may be used a general mixer having a controllable temperature within the range of −20-100° C. Preferably, a preheating temperature of a mould is within the range of 50~100° C.

The liquid modified sulfur binder was fabricated by the above methods, the solid modified sulfur binder was fabricated by cooling the liquid modified sulfur binder at a room temperature, and the hydraulic modified sulfur material (i.e., hydraulic modified sulfur mortar and hydraulic modified sulfur concrete) composition was fabricated by re-melting the solid modified sulfur binder.

Hereinafter, will be explained a combustible modified sulfur material composition and a fabricating method thereof, and a combustible modified sulfur material fabricated by molding and then cooling the same and a fabricating method thereof.

The combustible modified sulfur material composition according to the present invention includes the modified sulfur binder, and 80-400% by weight of aggregate, preferably 100-200% by weight of aggregate based on 100% by weight of the modified sulfur binder (refer to FIG. 1). Preferably, the combustible modified sulfur material composition further includes a filler for optimum filling effects, fluidity improvements, and concavity prevention. As the filler, may be used at least one selected from a group consisting of fly-ash, ordinary portland cement specified in KS L 5201, ground granulated blast furnace slag, silica fume, blast furnace slag cement, meta-kaolin or cement groups specified in KS L 0005 (standardized term in the field of hydraulic cement), calcium sulfate, and a mixture therebetween.

Based on 100% by weight of the modified sulfur binder, 1-80% by weight of the filler, preferably 25-60% by weight of the filler may be added.

When less than 1% by weight of the filler is added to the modified sulfur binder, filling effects with densification are lowered to cause a concaved phenomenon. However, when more than 80% by weight of the filler is added to the modified sulfur binder, the amount of the modified sulfur binder is relatively smaller to cause lowering of the fluidity and physical properties such as strength.

The conventional modified sulfur concrete having no concavity can be fabricated under conditions of an operation temperature of about 140~160° C., a mixer and a mould preheated to the same temperature, filling effects with a high density by a filler such as fly-ash. At the external construction site in winter, on-the-spot constructions were not possible due to drastic cooling outside a test piece and a temperature difference between inside and outside of the test piece, but only precast concrete was fabricated. However, the combustible modified sulfur material according to the present invention may be fabricated even in winter due to an operation characteristic at a comparatively low temperature of about 60~85° C., and may be molded without preheating a mould.

The combustible modified sulfur material composition may be fabricated by one of the following three methods. (a) A method for fabricating a combustible modified sulfur material composition, wherein a liquid modified sulfur binder is fabricated by melt-mixing sulfur with 0.1~100% by weight of a dicyclopentadiene-based modifier based on 100% by weight of the sulfur, and 0.01-200% by weight of a heterocyclicamine or alkylamine-based modifier based on 100% by weight of the sulfur at 120-160° C., and wherein a liquid modified sulfur binder composition is fabricated by mixing the liquid modified sulfur binder with 80-400% by weight of aggregate based on 100% by weight of the liquid modified sulfur binder at a maximum temperature of 100° C.

(b) A method for fabricating a combustible modified sulfur material composition, wherein a liquid modified sulfur binder is fabricated by melt-mixing sulfur with 0.1-100% by weight of a dicyclopentadiene-based modifier based on 100% by weight of the sulfur, and 0.01-200% by weight of a heterocyclicamine or alkylamine-based modifier based on 100% by weight of the sulfur at 120~160° C., wherein a solid modified sulfur binder is fabricated by cooling the liquid modified sulfur binder at a maximum temperature of 120° C., and wherein a liquid modified sulfur binder composition is fabricated by melting the solid modified sulfur binder at a maximum temperature of 100° C., and then by mixing 80-400% by weight of aggregate based on 100% by weight of the melted modified sulfur binder. (C) A method for fabricating a combustible modified sulfur material composition, wherein a liquid modified sulfur material composition is fabricated by melt-mixing sulfur with 0.1-100% by weight of a dicyclopentadiene-based modifier based on 100% by weight of the sulfur, 0.01-200% by weight of a heterocyclicamine or alkylamine-based modifier based on 100% by weight of the sulfur, and 80-400% by weight of aggregate based on 100% by weight of a mixture among the sulfur, the dicyclopentadiene-based modifier, and the heterocyclicamine or alkylamine-based modifier, at 120~160° C., for 0.01-3 hours.

A combustible modified sulfur material may be obtained by cooling the liquid modified sulfur material composition fabricated by one of the three methods, (a), (b) and (c). For instance, the liquid modified sulfur material composition is molded in a mould preheated to 50~160° C., then cooled and removed from the mould, thereby obtaining a combustible modified sulfur material. Hereinafter, preferred embodiments and comparative embodiments will be explained in more detail with reference to the attached drawings. However, the preferred embodiments and comparative embodiments are disclosed not to limit the scopes of the present invention, but to more clearly understand the present invention. The present invention will be understood within the technical ranges of claims to be later explained.

PREFERRED EMBODIMENT 1

A Method for Fabricating a Solid Modified Sulfur Binder

A 3-neck type of glass reactor for 500 ml was fabricated in a thermostat container having a constant temperature by an automatic temperature control (PID) method and using silicon oil as a thermal catalyst. 300 g of industrial sulfur powder was put into the reactor to melt the sulfur at about 130° C. Then, 60 g of dicyclopentadiene (industrial material having a purity of 85%) was slowly put into the reactor within about 5-10 minutes while stirring an impeller of the reactor. Here, the stirring process was performed for 40 minutes with maintaining a reaction temperature as 136° C. with paying attention to drastic temperature rise due to a heat emitting reaction. The reaction was performed for 10~20 minutes from a time point when a color of a reaction product started to change to a dark color from a transparent state of an orange color (i.e., a time point when a precursor started to be formed). Then, when the reaction product was changed to a dark red color from an opaque state, 30 g of pyridine was slowly put into the reactor to continuously perform the reaction. Once the reaction product has a darker color and has a viscosity as the reaction time lapses, one closure of the 3-neck type of glass reactor is opened to perform a process for vaporizing the pyridine. When the reaction product scarcely had smell and had a color change to a dark color (30 minutes later after the pyridine started to be vaporized), a final reaction temperature was 140° C. At this time, the reaction was completed, and the reaction product was cooled at a room temperature to fabricate a solid modified sulfur binder. The fabricated solid modified sulfur binder was re-melted at about 85° C.

PREFERRED EMBODIMENT 2

A Method for Fabricating a Hydraulic Modified Sulfur Mortar Specimen 30 g of the solid modified sulfur binder obtained in the preferred embodiment 1 and 1 g of a surfactant were melt-mixed with water inside a thermostat container having a constant temperature of about 85° C. Then, 270 g of ordinary portland cement and 300 g of sand having a particle diameter of 3-10 mm were put into the thermostat container, and were manually mixed with one another by using a spoon and chopsticks. Then, the mixture was molded at a 5 cm-squared cubic mould, and was cooled in the atmosphere, thereby fabricating a hydraulic modified sulfur mortar specimen. The fabricated hydraulic modified sulfur mortar specimen was put into a climate chamber having a relative humidity of 90% at 23° C. together with the mould, and then was removed from the mould after one day, thereby obtaining a hydraulic modified sulfur mortar specimen. Then, the obtained hydraulic modified sulfur mortar specimen was put into a clean running water bath having a temperature of about 23° C., thereby experimenting physical properties of the respective mortar specimens according to lapses of ages.

PREFERRED EMBODIMENT 3

A Method for Fabricating a Hydraulic Modified Sulfur Concrete Specimen 30 g of the solid modified sulfur binder obtained in the preferred embodiment 1 and 1 g of a surfactant were melt-mixed with water inside a thermostat container having a constant temperature of about 85° C. Then, 270 g of ordinary portland cement, 300 g of sand having a particle diameter of 3~10 mm, and 300 g of coarse aggregate having a particle diameter of 10~18 mm were put into the thermostat container, and were manually mixed with one another by using a spoon and chopsticks. Then, the mixture was molded in a cylindrical mould having a diameter of 10 cm and a length of 20 cm, and was cooled in the atmosphere, thereby fabricating a hydraulic modified sulfur concrete specimen. The fabricated hydraulic modified sulfur concrete specimen was put into a climate chamber having a relative humidity of 90% at 23° C. together with the mould, and then was removed from the mould after one day, thereby obtaining a hydraulic modified sulfur concrete specimen. Then, the obtained hydraulic modified sulfur concrete specimen was put into a clean running water bath having a temperature of about 23° C., thereby experimenting physical properties of the respective mortar specimens according to lapses of ages.

COMPARATIVE EMBODIMENT 1

A Method for Fabricating an Ordinary Modified Sulfur Binder

In order to compare with the preferred embodiment 1, as disclosed in the conventional method, a 3-hole type of glass reactor for 600 ml was fabricated in a thermostat container having a constant temperature by a PID method and using silicon oil as a thermal catalyst. The 3-hole type of glass reactor has one center hole installed with a German IKA impeller mounted with 45/50 joint, one hole fitted with a condenser for 24/40 joint, and another hole for injecting oligomer and dicyclopentadiene (DCPD). 4,000 g of industrial sulfur powder was put into the reactor, and the temperature was gradually increased to melt the sulfur into a liquid state at 130° C. Then, 100 cc of cyclopentadiene oligomer (industrial material having a purity of 85%) was put into the reactor within about 5~10 minutes with a stirring process. Then, 100 cc of dicyclopentadiene (DCPD) was put into the reactor after about 10 minutes. And, the stirring process was performed with maintaining a reaction temperature as 140° C. with paying attention to temperature rise of the liquid inside the reactor from 130° C. to about 145° C. due to a heat emitting reaction. A little viscosity occurred after lapses of about 4 hours. At this time, the reaction was completed and the resulting material was cooled at a room temperature, thereby obtaining an ordinary modified sulfur binder.

COMPARATIVE EMBODIMENT 2

A Method for Fabricating an Ordinary Modified Sulfur Mortar Specimen

The solid modified sulfur binder obtained in the comparative embodiment 1 was mixed with general sand with a weight ratio of 1:2, and then the mixture was put into a mixer thus to be melt-mixed. Then, the mixture was molded at a 5 cm-squared mould preheated at about 140° C., and was cooled in the atmosphere, thereby fabricating an ordinary modified sulfur mortar specimen.

COMPARATIVE EMBODIMENT 3

A Method for Fabricating an Ordinary Modified Sulfur Concrete Specimen

The solid modified sulfur binder obtained in the comparative embodiment 1, ordinary sand, and coarse sand were mixed with one another with a weight ratio of 1:2:2, and then the mixture was put into a mixer having a constant temperature of about 140° C. thus to be melt-mixed. Then, the mixture was molded in a cylindrical mould having a diameter of 10 cm and a length of 20 cm and preheated at about 140° C., and was cooled in the atmosphere, thereby fabricating an ordinary modified sulfur concrete specimen.

EXPERIMENTAL RESULTS 1

Comparison Results Between Re-Melting Temperatures of Modified Sulfur Binders A liquid transition of the solid modified sulfur binder obtained in the preferred embodiment 1 was compared with that of the ordinary modified sulfur binder obtained in the comparative embodiment 1 according to changes of re-melting temperatures.

A proper amount of the solid modified sulfur binder obtained in the preferred embodiment 1, and a proper amount of the ordinary modified sulfur binder obtained in the comparative embodiment 1 were put into test tubes, and then were put into a heater having a controllable constant temperature. Then, liquid transitions of the solid modified sulfur binder and the ordinary modified sulfur binder were observed at each temperature of 'room temperature→110~120° C.→180° C.→room temperature', and results thereof were shown in FIGS. 2 and 3.

Figure 2:
FIGS. 2 and 3 are photos showing re-melted states and liquid phase changes of a conventional modified sulfur binder obtained from a comparative embodiment 1, and a modified sulfur binder obtained from a preferred embodiment 4 of the present invention.
Figure 3:
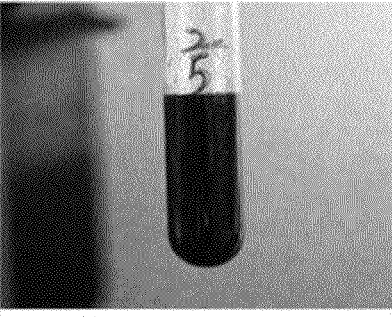

Referring to FIGS. 2 and 3, the solid modified sulfur binder obtained in the preferred embodiment 1 was re-melted at 85° C., and showed a stable state without continuous phase separation even under a risen temperature condition. When being cooled to a room temperature, the modified sulfur binder obtained in the preferred embodiment 1 exhibited a color and a solidified shape shown in the comparative embodiment 1. On the contrary, the ordinary modified sulfur binder obtained in the comparative embodiment 1 was not re-melted at 85° C. where it was in a flake state. When the temperature of the ordinary modified sulfur binder was continuously increased, the ordinary modified sulfur binder was melted at 110-120° C. When being cooled to a room temperature, the general sulfur binder obtained in the comparative embodiment 1 exhibited a color and a shape of the modified sulfur binder shown in the preferred embodiment 1. As can be known from the experimental results, the modified sulfur binder according to the present invention was re-melted at a temperature less than 100° C., whereas the ordinary modified sulfur binder was not melted at a temperature less than 100° C. but was melted at 110~120° C. Therefore, it was proved that the ordinary modified sulfur binder could not be re-melted under water having a temperature less than 100° C. with a surfactant thus not to be mixed with a hydraulic material and aggregate.

EXPERIMENTAL RESULTS 2

Comparison Results of Each Hydrophilicity of Modified Sulfur Binders

Hydrophilicity of the solid modified sulfur binder obtained in the preferred embodiment 1 was compared with that of the ordinary modified sulfur binder obtained in the comparative embodiment 1 in a melted state. A proper amount of the solid modified sulfur binder obtained in the preferred embodiment 1, and a proper amount of the ordinary modified sulfur binder obtained in the comparative embodiment 1 were put into three-hole flasks, and then were melted by gradually having increased temperatures. Here, the test piece obtained in the preferred embodiment 1 was melted at about 85° C., whereas the test piece obtained in the comparative embodiment 1 was melted at about 114° C. To the melted test bodies, water having a temperature of about 90° C. was gradually dropped to observe changes of the melted test bodies, and results thereof were shown in FIG. 4.

Figure 4:
FIG. 4 are photos showing liquid phase changes of a conventional modified sulfur binder obtained from a comparative embodiment 1, and a modified sulfur binder obtained from a preferred embodiment 5 of the present invention when reacting with water in a melted state.
Figure 4:
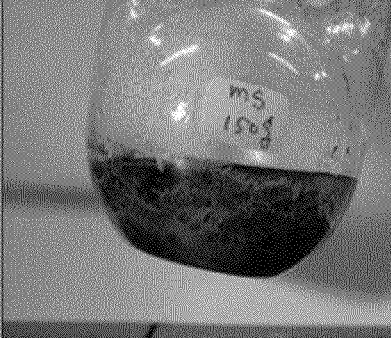
Figure 4:
Figure 4:
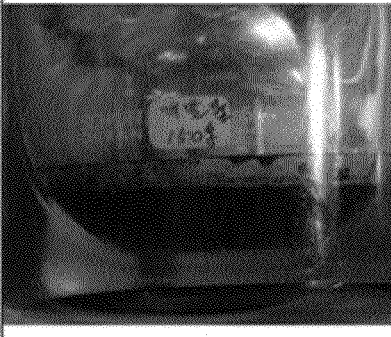

Referring to FIG. 4, the modified sulfur binder obtained in the preferred embodiment 1 did not form sediments even when contacting water of about 90° C. in a melted state, but was in a liquid state without changes. However, the modified sulfur binder obtained in the comparative embodiment 1 and having a physical property of being re-melted at 110-120° C. formed sediments upon contacting water of about 90° C. The sediments of the modified sulfur binder obtained in the comparative embodiment 1 was in a solid state without being melted even under an increased temperature condition.

Accordingly, it was observed that the modified sulfur binder continuously moved upwardly with air bubbles due to a boiling phenomenon.

EXPERIMENTAL RESULTS 3

Results of Combustion Tests of Modified Sulfur Mortar

The hydraulic modified sulfur mortar fabricated in the preferred embodiment 2, and the ordinary modified sulfur mortar fabricated in the comparative embodiment 2 underwent a combustion test in fire, respectively.

Figure 5:
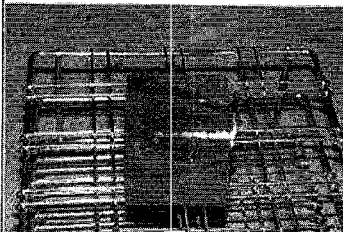
FIG. 5 is a photo showing torch combustion test results of conventional modified sulfur mortar obtained from a comparative embodiment 2, and modified sulfur mortar obtained from a preferred embodiment 6 of the present invention.
Figure 5:
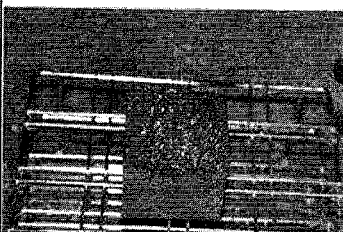
Figure 5:
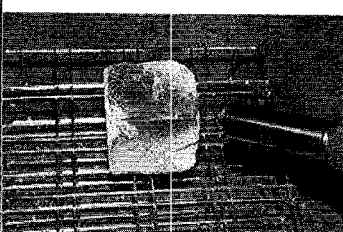
Figure 5:
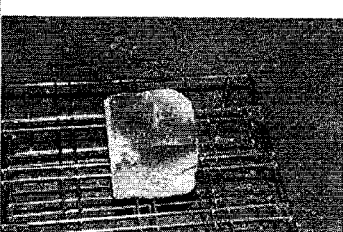

The hydraulic modifier sulfur mortar and the ordinary modified sulfur mortar burnt by strong flame using combustible torch for about 5 minutes, and shapes thereof were observed. The observed results were shown in FIG. 5. Referring to FIG. 5, the hydraulic modified sulfur mortar fabricated in the preferred embodiment 2 did not burn in fire using combustible torch.

However, the ordinary modified sulfur mortar fabricated in the comparative embodiment 2, a polymer compound, burnt in fire, and the sulfur was melted to drop.

EXPERIMENTAL RESULTS 4

Comparison Results of Surface Degradation of Mortar

Thermal degradation on the surface of the hydraulic modified sulfur mortar fabricated in the preferred embodiment 2 was compared with that of ordinary portland cement mortar. The surface degradation occurs when moisture contained in the mortar burns in fire.

The surface of the hydraulic modified sulfur mortar fabricated in the preferred embodiment 2, and the surface of the ordinary portland cement mortar were heated by strong flame for about 5 minutes. Then, the surface changes were observed, and the results thereof were shown in FIG. 6.

Figure 6:
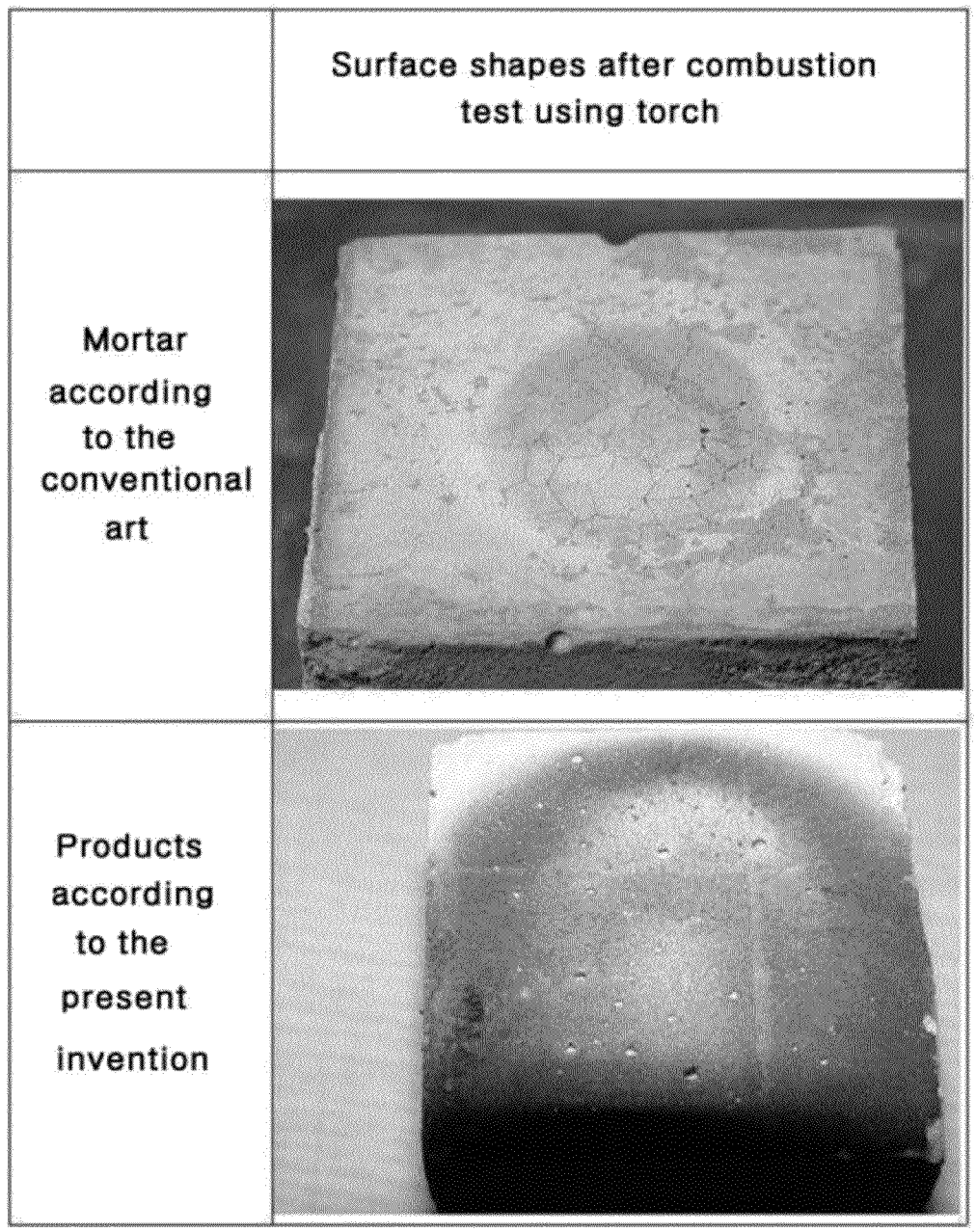
FIG. 6 are photos comparing surface degradation of conventional Portland cement mortar after torch combustion tests, with that of modified sulfur mortar obtained from a preferred embodiment 7 of the present invention.

As analysis results of the experiments shown in FIG. 6, the surface of the hydraulic modified sulfur mortar fabricated in the preferred embodiment 2 scarcely had cracks thereon after the combustion test using torch, whereas the surface of the ordinary portland cement mortar had minute cracks thereon.

Actually, small pieces sputtered with a sound, on the surface of the test piece, in a plurality of directions during the combustion test. Generally, about 2-5% by weight of moisture always exists in the ordinary portland cement mortar.

The moisture badly influences on durability of the ordinary portland cement mortar together with an air gap. When the surface of cement mortar or concrete is heated by torch, moisture inside the cement mortar or concrete is evaporated to be discharged out of the surface of the test piece. This causes small pieces to be sputtered with a sound, on the surface of the test piece in a plurality of directions. As a result, cracks such as spider webs occur on the surface of the test piece, which is called as 'degradation'.

The modified sulfur binder and/or hydraulic modified sulfur material composition, etc. according to the present invention may be applicable to median strips, bridges, tunnels, general roads, drainpipes, drainage/waste water storage tanks, inner walls of ports, lakefront blocks, sea banks, tanks for chemical materials, etc.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A modified sulfur binder, comprising:
   sulfur;
   0.1-100% by weight of a dicyclopentadiene-based modifier based on 100% by weight of the sulfur, serving as a modifier of the sulfur; and
   0.01-200% by weight of a heterocyclicamine or alkylamine-based modifier based on 100% by weight of the sulfur, serving as a modifier of the sulfur,
   wherein the sulfur and the modifiers are melt-mixed with one another; and
   wherein the modified sulfur binder is re-melted at a temperature less than 100° C.

2. The modified sulfur binder of claim 1, wherein the dicyclopentadiene-based modifier comprises:
   (1) dicyclopentadiene (DCPD) or an exclusive polymer, or
   (2) a mixture obtained by mixing the DCPD with at least one of cyclopentadiene (CPD), a polymer thereof, DCPD derivatives, and CPD derivatives, or
   (3) a mixture obtained by mixing the (1) or (2) with at least one of dipentene, vinyl toluene, styrene monomer, and dicyclo pentane.

3. The modified sulfur binder of claim 1, wherein the heterocyclicamine-based modifier is obtained by selecting one or more materials from a group consisting of pyridine, a polymer thereof, homologues of the pyridine, isomers of the pyridine, isomers of the homologues of the pyridine, quinoline, isoquinoline, acridine, and pyrrole.

4. The modified sulfur binder of claim 1, wherein the modified sulfur binder is in a liquid state or a solid state.

5. A method for fabricating a modified sulfur binder, comprising:
   fabricating a liquid modified sulfur binder by melt-mixing sulfur with 0.1-100% by weight of a dicyclopentadiene-based modifier based on 100% by weight of the sulfur, and 0.01-200% by weight of a heterocyclicamine or alkylamine-based modifier based on 100% by weight of the sulfur, at 120-160° C.;
   wherein the heterocyclicamine or alkylamine-based modifier is vaporized when a reaction product obtained by the melt-mixing has a viscosity of 0.01-100.0 Pa·s.

6. The method of claim 5, wherein the dicyclopentadiene-based modifier comprises:
   (1) dicyclopentadiene (DCPD) or an exclusive polymer, or
   (2) a mixture obtained by mixing the DCPD with at least one of cyclopentadiene (CPD), a polymer thereof, DCPD derivatives, and CPD derivatives, or
   (3) a mixture obtained by mixing the (1) or (2) with at least one of dipentene, vinyl toluene, styrene monomer, and dicyclo pentene.

7. The method of claim 5, wherein the heterocyclicamine-based modifier is obtained by selecting one or more materials from a group consisting of pyridine, a polymer thereof, homologues of the pyridine, isomers of the pyridine, isomers of the homologues of the pyridine, quinoline, isoquinoline, acridine, and pyrrole.

8. The method of claim 5, wherein the melt-mixing is finished when the reaction product obtained by the melt-mixing has a viscosity of 0.01-100.0 Pa·s at 140° C.

9. The method of claim 5, wherein a liquid modified sulfur binder is fabricated by heat-reacting the sulfur with the dicyclopentadiene-based modifier, then by adding the heterocyclicamine or alkylamine-based modifier to the mixture, and by performing a heating process.

10. The method of claim 9, wherein when a reaction product obtained by reacting the sulfur and the dicyclopentadiene-based modifier with each other has a viscosity of 0.01-100.0 Pa·s, the heterocyclicamine or alkylamine-based modifier is added to the mixture.

11. The method of claim 5, wherein a liquid modified sulfur binder is fabricated by mixing the dicyclopentadiene-based modifier with the heterocyclicamine or alkylamine-based modifier, then by adding the sulfur to the mixture, and by performing a heating process.

12. The method of claim 5, wherein a liquid modified sulfur binder is fabricated by heat-reacting the sulfur with the heterocyclicamine or alkylamine-based modifier, then by adding the dicyclopentadiene-based modifier to the mixture, and by performing a heating process.

13. The method of claim 5, wherein a solid modified sulfur binder is fabricated by heat-reacting the sulfur with the dicyclopentadiene-based modifier, by melting the solid modified sulfur binder, by adding the heterocyclicamine or alkylamine-based modifier to the melted solid modified sulfur binder, and by performing a heating process.

14. The method of claim 5, wherein the solid modified sulfur binder is fabricated by cooling the liquid modified sulfur binder at a maximum temperature of 120° C.

15. A hydraulic modified sulfur material composition, comprising:
   a modified sulfur binder obtained by melt-mixing sulfur with 0.1-100% by weight of a dicyclopentadiene-based modifier based on 100% by weight of the sulfur, and 0.01-200% by weight of a heterocyclicamine or alkylamine-based modifier based on 100% by weight of the sulfur;
   0.01-50% by weight of a surfactant based on 100% by weight of the modified sulfur binder;
   100-9900% by weight of a hydraulic material based on 100% by weight of the modified sulfur binder;
   15-70% by weight of water based on 100% by weight of a mixture between the modified sulfur binder and the hydraulic material; and
   80-400% by weight of aggregate based on 100% by weight of the mixture between the modified sulfur binder and the hydraulic material.

16. The hydraulic modified sulfur material composition of claim 15, wherein the dicyclopentadiene-based modifier comprises:
   (1) dicyclopentadiene (DCPD) or an exclusive polymer, or
   (2) a mixture obtained by mixing the DCPD with at least one of cyclopentadiene (CPD), a polymer thereof, DCPD derivatives, and CPD derivatives, or
   (3) a mixture obtained by mixing the (1) or (2) with at least one of dipentene, vinyl toluene, styrene monomer, and dicyclo pentene.

17. The hydraulic modified sulfur material composition of claim 15, wherein the heterocyclicamine-based modifier is obtained by selecting one or more materials from a group consisting of pyridine, a polymer thereof, homologues of the pyridine, isomers of the pyridine, isomers of the homologues of the pyridine, quinoline, isoquinoline, acridine, and pyrrole.

18. The hydraulic modified sulfur material composition of claim 15, wherein the surfactant comprises at least one of:
   a negative-ion surfactant such as soap and alkylbenzene-sulfonic acid salts;
   a positive-ion surfactant such as a high level of amine halogen compounds, preparing quaternary ammonium compound (QAC) salts, and alkylpyridinium salts;
   a nonionic surfactant such as nonylphenol and octylphenol; and
   an amphoteric surfactant such as amino acid.

19. The hydraulic modified sulfur material composition of claim 15, wherein the hydraulic material is obtained by selecting one or more materials from a group consisting of:
   (1) fly-ash;
   (2) ordinary portland cement specified in KS L 5201, ground granulated blast furnace slag, silica fume, blast furnace slag cement, and meta-kaolin; and
   (3) cement groups specified in KS L 0005 (standardized term in the field of hydraulic cement), calcium sulfate, and a mixture therebetween.

20. The hydraulic modified sulfur material composition of claim 15, wherein the aggregate is obtained by selecting one or more materials from a group consisting of recyclable industrial wastes, river sand, crushed stone, fly ash, sea sand, quartz sand, pebbles, silica, quartz powder, light-weighted aggregate, clay minerals, and glass powder.

21. The hydraulic modified sulfur material composition of claim 15, wherein the aggregate is fine aggregate, and the hydraulic modified sulfur material is hydraulic modified sulfur mortar.

22. The hydraulic modified sulfur material composition of claim 15, wherein the aggregate comprises fine aggregate and coarse aggregate, the fine aggregate is mixed with the coarse aggregate with a weight ratio of 1:1-1:4, and the hydraulic modified sulfur material is hydraulic modified sulfur concrete.

23. The hydraulic modified sulfur material composition of claim 15, based on 100% by weight of a mixture between the modified sulfur binder and the hydraulic material, further comprising at least one:
   1-20% by weight of a flexural strength reinforcement including reinforced steel, steel fiber, fiber filler, fibrous particles, fine particles, and a mixture therebetween;
   10-50% by weight of a polymer cement group, a polymer cement mortar group, and a mixture therebetween;
   0.1-3% by weight of a water-reducing agent having a high performance;
   0.1-3% by weight of an air entraining agent;
   0.1-3% by weight of a hardening accelerator, a hardening retardant, a set accelerating agent, and a mixture therebetween;
   0.1-3% by weight of pigments; and
   0.1-3% by weight of aromatics.

24. A hydraulic modified sulfur material, comprising:
   a modified sulfur binder obtained by melt-mixing sulfur with 0.1-100% by weight of a dicyclopentadiene-based modifier based on 100% by weight of the sulfur, and 0.01-200% by weight of a heterocyclicamine or alkylamine-based modifier based on 100% by weight of the sulfur;
   0.01-50% by weight of a surfactant based on 100% by weight of the modified sulfur binder;
   100-9900% by weight of a hydraulic material based on 100% by weight of the modified sulfur binder; and
   80-400% by weight of aggregate based on 100% by weight of a mixture between the modified sulfur binder and the hydraulic material.

25. A method for fabricating a hydraulic modified sulfur material composition, comprising:

fabricating a liquid modified sulfur binder by melt-mixing sulfur with 0.1-100% by weight of a dicyclopentadiene-based modifier based on 100% by weight of the sulfur, and 0.01-200% by weight of a heterocyclicamine or alkylamine-based modifier based on 100% by weight of the sulfur, at 120-160° C.;

obtaining a solid modified sulfur binder by cooling the liquid modified sulfur binder at a maximum temperature of 120° C.; and fabricating a hydraulic modified sulfur material composition by mixing a surfactant, a hydraulic material, water, and aggregate with the solid modified sulfur binder which is in a melted state at a maximum temperature of 100° C.

26. The method of claim 25, wherein the dicyclopentadiene-based modifier comprises:
(1) dicyclopentadiene (DCPD) or an exclusive polymer, or
(2) a mixture obtained by mixing the DCPD with at least one of cyclopentadiene (CPD), a polymer thereof, DCPD derivatives, and CPD derivatives, or
(3) a mixture obtained by mixing the (1) or (2) with at least one of dipentene, vinyl toluene, styrene monomer, and dicyclo pentene.

27. The method of claim 25, wherein the heterocyclicamine-based modifier is obtained by selecting one or more materials from a group consisting of pyridine, a polymer thereof, homologues of the pyridine, isomers of the pyridine, isomers of the homologues of the pyridine, quinoline, isoquinoline, acridine, and pyrrole.

28. The method of claim 25, wherein 0.01-50% by weight of the surfactant based on 100% by weight of the solid modified sulfur binder is used,
100-9900% by weight of the hydraulic material based on 100% by weight of the solid modified sulfur binder is used,
15-70% by weight of the water based on 100% by weight of a mixture between the solid modified sulfur binder and the hydraulic material is used, and
80-400% by weight of the aggregate based on 100% by weight of the mixture between the solid modified sulfur binder and the hydraulic material is used.

29. The method of claim 25, wherein the hydraulic modified sulfur material is obtained by cooling the fabricated hydraulic modified sulfur material composition.

30. The method of claim 29, wherein the hydraulic modified sulfur material is obtained by molding the hydraulic modified sulfur material composition in a mould preheated to 50-160° C., cooling and then the hydraulic modified sulfur material composition from the mould.

31. A combustible modified sulfur material composition, comprising:
sulfur;
a modified sulfur binder obtained by melt-mixing the sulfur with 0.1-100% by weight of a dicyclopentadiene-based modifier based on 100% by weight of the sulfur, and 0.01-200% by weight of a heterocyclicamine or alkylamine-based modifier based on 100% by weight of the sulfur; and
80-400% by weight of aggregate based on 100% by weight of the modified sulfur binder.

32. The combustible modified sulfur material composition of claim 31, wherein the modified sulfur binder material composition further comprises:
1-80% by weight of a filler based on 100% by weight of the modified sulfur binder, and
wherein the filler is obtained by selecting one or more materials from a group consisting of:
(1) fly-ash;
(2) ordinary portland cement specified in KS L 5201, ground granulated blast furnace slag, silica fume, blast furnace slag cement, and meta-kaolin; and
(3) cement groups specified in KS L 0005 (standardized term in the field of hydraulic cement), calcium sulfate, and a mixture therebetween.

33. A method for fabricating a combustible modified sulfur material composition, comprising:
fabricating a liquid modified sulfur binder by melt-mixing sulfur with 0.1-100% by weight of a dicyclopentadiene-based modifier based on 100% by weight of the sulfur, and 0.01-200% by weight of a heterocyclicamine or alkylamine-based modifier based on 100% by weight of the sulfur, at 120-160° C.; and
fabricating a liquid modified sulfur material composition by melt-mixing the liquid modified sulfur binder with 80-400% by weight of aggregate based on 100% by weight of the liquid modified sulfur binder, at a maximum temperature of 100° C.

34. A method for fabricating a combustible modified sulfur material composition, comprising:
fabricating a liquid modified sulfur binder by melt-mixing sulfur with 0.1-100% by weight of a dicyclopentadiene-based modifier based on 100% by weight of the sulfur, and 0.01-200% by weight of a heterocyclicamine or alkylamine-based modifier based on 100% by weight of the sulfur, at 120-160° C.;
fabricating a solid modified sulfur binder by cooling the liquid modified sulfur binder at a maximum temperature of 120° C.; and
fabricating a liquid modified sulfur material composition by melting the solid modified sulfur binder at a maximum temperature of 100° C., and then by mixing the melted modified sulfur binder with 80-400% by weight of aggregate based on 100% by weight of the melted modified sulfur binder.

35. A method for fabricating a combustible modified sulfur material composition, comprising:
fabricating a liquid modified sulfur material composition by simultaneously melt-mixing sulfur with 0.1-100% by weight of a dicyclopentadiene-based modifier based on 100% by weight of the sulfur, 0.1-200% by weight of a heterocyclicamine or alkylamine-based modifier based on 100% by weight of the sulfur, and 80-400% by weight of aggregate based on 100% by weight of a total mixture among the sulfur, the dicyclopentadiene-based modifier, and the heterocyclicamine or alkylamine-based modifier, at 120-160° C. for 0.01-3 hours.

36. The method of claim 33, wherein a combustible modified sulfur material is obtained by cooling the fabricated liquid modified sulfur material composition.

* * * * *